United States Patent
Amitai

(10) Patent No.: US 10,023,485 B2
(45) Date of Patent: Jul. 17, 2018

(54) WASTEWATER TREATMENT SYSTEM

(75) Inventor: Gadi Amitai, Haifa (IL)

(73) Assignee: TRIPLE T PURIFICATION LTD., Hadera (IL)

( * ) Notice: Subject to any disclaimer, the term of this patent is extended or adjusted under 35 U.S.C. 154(b) by 271 days.

(21) Appl. No.: 13/817,880

(22) PCT Filed: Aug. 24, 2011

(86) PCT No.: PCT/IL2011/000684
§ 371 (c)(1),
(2), (4) Date: Feb. 20, 2013

(87) PCT Pub. No.: WO2012/025926
PCT Pub. Date: Mar. 1, 2012

(65) Prior Publication Data
US 2013/0153492 A1 Jun. 20, 2013

Related U.S. Application Data

(60) Provisional application No. 61/376,505, filed on Aug. 24, 2010.

(51) Int. Cl.
*C02F 3/12* (2006.01)
*B01D 21/24* (2006.01)
(Continued)

(52) U.S. Cl.
CPC ............ *C02F 3/006* (2013.01); *C02F 3/04* (2013.01); *C02F 3/06* (2013.01); *C02F 3/30* (2013.01);
(Continued)

(58) Field of Classification Search
CPC ....... Y02W 10/15; Y02W 10/18; C02F 3/302; C02F 2209/42; C02F 3/00; C02F 3/006; C02F 3/121; B01D 53/84
(Continued)

(56) References Cited

U.S. PATENT DOCUMENTS

| 4,045,909 A | 9/1977 | Moss |
| 4,161,992 A | 7/1979 | Abels et al. |

(Continued)

FOREIGN PATENT DOCUMENTS

WO   WO 2002/064508   8/2002

OTHER PUBLICATIONS

International Search Report and Written Opinion from International Application No. PCT/IL2011/000684 dated Dec. 22, 2011.
(Continued)

*Primary Examiner* — Claire A Norris
(74) *Attorney, Agent, or Firm* — Dorsey & Whitney LLP

(57) ABSTRACT

The invention provides a system for treatment of wastewater. A pumping system pumps wastewater from a source basin to a recipient basin, while a conduit allows gravitational flow of water from a source basin to a recipient basin when the pumping system is inactive. A controller activates the pumping system to pump wastewater from the source basin to a recipient basin when a wastewater level in the source basin is at a first predetermined height or when a rate of gravitational flow wastewater from the source basin to the recipient basin is below a first predetermined flow rate. The controller also turns off the pumping system when the water level in the source basin is at a source basin minimal level and the water level in the recipient basin is at a recipient basin maximal level. The invention also provides a method for operating a wastewater treatment of the invention, and a pumping system for use in the system of the invention.

10 Claims, 10 Drawing Sheets

(51) Int. Cl.
*C02F 3/00* (2006.01)
*C02F 3/04* (2006.01)
*C02F 3/06* (2006.01)
*C02F 3/30* (2006.01)
*C02F 3/32* (2006.01)

(52) U.S. Cl.
CPC .......... *C02F 3/327* (2013.01); *C02F 2203/00* (2013.01); *C02F 2209/40* (2013.01); *C02F 2209/42* (2013.01); *Y02W 10/15* (2015.05)

(58) Field of Classification Search
USPC .................................. 210/201, 255, 97, 614
See application file for complete search history.

(56) References Cited

U.S. PATENT DOCUMENTS

| | | |
|---|---|---|
| 4,177,147 A | 12/1979 | Roberts |
| 4,351,721 A | 9/1982 | Frandsen |
| 5,080,793 A | 1/1992 | Urlings |
| 5,863,433 A | 1/1999 | Behrends |
| 5,893,975 A | 4/1999 | Eifert |
| 6,159,371 A | 12/2000 | Dufay |
| 6,200,469 B1 | 3/2001 | Wallace |
| 6,406,627 B1 | 6/2002 | Wallace |
| 6,576,130 B2 | 6/2003 | Wallace |
| 6,652,743 B2 | 11/2003 | Wallace et al. |
| 6,830,688 B2 | 12/2004 | Austin et al. |
| 6,863,816 B2 | 3/2005 | Austin et al. |
| 6,896,805 B2 | 5/2005 | Austin |
| 7,056,438 B2 | 6/2006 | Austin |
| 7,276,164 B2 | 10/2007 | Shockley et al. |
| 7,320,752 B2 | 1/2008 | Austin et al. |
| 2005/0051482 A1* | 3/2005 | Austin ................ C02F 3/085 210/619 |
| 2008/0006739 A1 | 1/2008 | Mochida et al. |
| 2009/0139928 A1* | 6/2009 | Rodgers et al. .......... 210/610 |

OTHER PUBLICATIONS

International Preliminary Report on Patentability from International Application No. PCT/IL2011/000684 dated Sep. 18, 2012.

* cited by examiner

WASTEWATER TREATMENT SYSTEM

FIELD OF THE INVENTION

This invention relates to systems for wastewater treatment.

BACKGROUND OF THE INVENTION

Wastewater treatment systems typically comprise one or more basins having essentially impermeable sides and bottom. One or more substrate layers such as soil, gravel, or synthetic media are placed on the bottom to support aquatic organisms such as bacteria, algae or the roots of aquatic plants. These systems have been used to reduce oxygen demand, suspended solids, pathogenic bacteria, and other wastewater constituents from domestic, industrial and agricultural wastewaters.

A reciprocating wastewater treatment system has two basins. Wastewater is introduced into one or both basins, and is then made to flow back and forth between the two basins. The frequency of the fill and drain cycle can be adjusted to control conditions for specific biotic and abiotic reactions such as nitrification, denitrification, sulfate reduction, and methanogenesis. Known reciprocating wetlands utilize pumps or airlift to move the liquid from one basin to the other, such as is disclosed in U.S. Pat. No. 5,863,433 to Behrends.

SUMMARY OF THE INVENTION

As used herein, the term "wastewater treatment system" refers to any system for the treatment of wastewater, and includes such systems as constructed wetlands, bioreactors, and trickling filters.

In its first aspect, the present invention provides a system for treating wastewater. The system of the invention comprises at least two basins, adapted to retain wastewater to be treated. Each basin is configured to receive a substrate for the treatment of wastewater contained in the basins. Each basin alternates between a state of being a source basin and a state of being a recipient basin. A pumping system pumps wastewater from a source basin to a recipient basin. Activation and deactivation of the pumping system is under the control of a controller that is configured to execute a pumping regime between the basins. When the water level in the source basin is above the water level of the recipient basin, water can flow from the source basin to the recipient basin under the influence of gravity. When the water level in the source basin is below the water level of the recipient basin, water is pumped by the pumping system from the source basin to the recipient basin until the water level in the source basin is at a minimal level and the water level in the recipient basin is at a maximal level. At this stage, the source basin becomes a recipient basin and the recipient basin becomes a source basin, and the process can be repeated with water flow in the opposite direction. When the wastewater treatment system of the invention comprises exactly two basins, the system can function as a reciprocating wetlands in which wastewater reciprocates between the two basins.

In its second aspect, the invention provides a process for operating the wastewater treatment system of the invention. Starting from an initial configuration in which a source basin and a recipient basin contain wastewater to be treated with the water level in the source basin above the water level of the recipient basin, wastewater is allowed to flow under the influence of gravity alone from the source basin to the recipient basin. When the water level of the two basins is at about the same level, water is pumped from the source basin to the recipient basin until the water level in the source basin reaches a minimal level and the water level in the recipient reaches a maximal level. The source basin then becomes a recipient basin and the recipient basin becomes a source basin, and the process can be repeated with the new source basins and recipient basins.

The inventors have found that by using a combination of gravitational flow and pumping to move water from one basin to the other can provide a significant savings in energy expenditure in comparison to prior art reciprocating systems.

The invention thus provides a system for treatment of wastewater comprising:
 (a) at least two basins, each basin alternating between a state of being a source basin, delivering liquid, and a state of being a recipient basin, receiving liquid;
 (b) a pumping system configured to pump wastewater from a source basin to a recipient basin;
 (c) a conduit allowing gravitational flow of water from a source basin to a recipient basin when the pumping system is inactive; and
 (d) a controller configured to, for one or more pairs of a source basin and an adjacent recipient basin:
  (a) activate the pumping system to pump wastewater from source basin to a recipient basin when a wastewater level in the source basin is at a first predetermined height or when a rate of gravitational flow wastewater from the source basin to the recipient basin is below a first predetermined flow rate;
  (b) turn off the pumping system when the water level in the source basin is at a source basin minimal level or the water level in the recipient basin is at a recipient basin maximal level;

wherein the first predetermined height is less than a source basin maximal level.

The system may have exactly two basins.

In one embodiment of the invention, the system each basin has a bottom surface, the bottom surfaces of the basins being coplanar with each other.

In one embodiment, a pumping head of the pumping system is regulated to match a net actual head.

The system may further comprise a pumping chamber conducting water between at least one pair of adjacent basins. The system may comprise a wastewater delivery pipe having two branches in the pumping chamber. Each of the two branches of the delivery pipe may be provided with a Venturi suction arrangement.

The pumping system may comprise one or more propeller pumps. The system may comprise one or more sensors sensing a water level in at least one of the basins.

At least one basin may be provided with a system of pipes conducting wastewater between the basin and the pumping system. At least one basin may be provided with an overflow weir for removal of effluent from the basin.

In another of its aspects, the invention provides a method for operating a system for treatment of wastewater having at least two basins, each basin alternating between a state of being a source basin and a state of being a recipient basin, the method comprising, for each pair of a source basin and a recipient basin:
 (a) allowing a gravitational flow of wastewater from the source basin to the recipient basin under the influence of gravity when a water level in the source basin is above a water level of the recipient basin;

(b) pumping wastewater from the source basin to the recipient basin when a wastewater level in the source basin is at a first predetermined height or when a rate of gravitational flow of wastewater from the source basin to the recipient basin is below a first predetermined flow rate, and (c) turn off the pumping system when the water level in the source basin is at a source basin minimal level, or when the water level in the recipient basin is at a recipient basin maximal level, or when a ratio of flow rate to energy input is below a predetermined level;

wherein the first predetermined height is less than a source basin maximal level.

The method of the invention may be implemented in a wastewater treatment system comprising exactly two basins.

The invention also provides a pumping system for use in the system for wastewater treatment of the invention. The pumping system comprising:

(b) a receptacle tank for receiving wastewater to be treated, the receptacle tank being provided with a first outlet pipe 8' and a second outlet pipe;

(c) a first pump and a second pump;

(d) a processor configured to receive a signal indicative of a liquid level in a first basin and in a second basin and to activate and deactivate the first and second pumps in order to execute the method of operating a system for treatment of wastewater according to the invention;

The pumping system may be provided with a branched wastewater delivery pipe.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
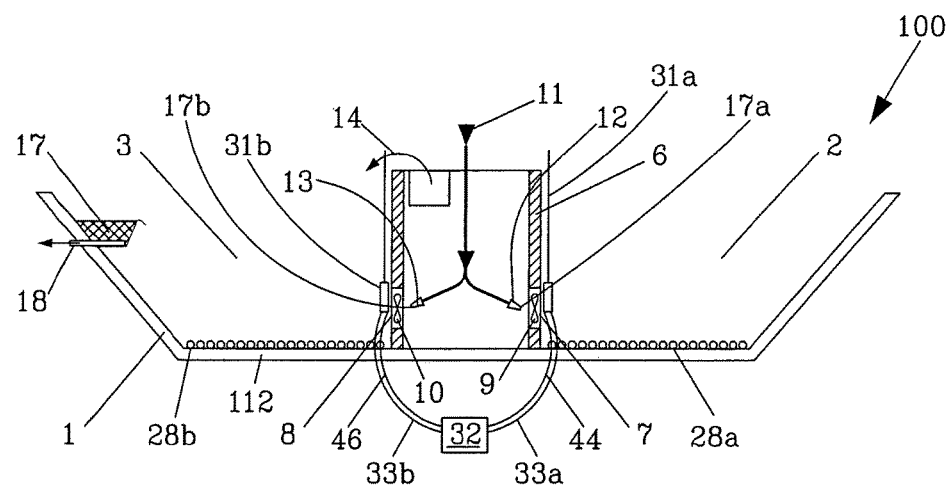
FIG. 1 shows a cross sectional side view of system for treating wastewater having two basins in accordance with one embodiment of the invention.
Figure 2:
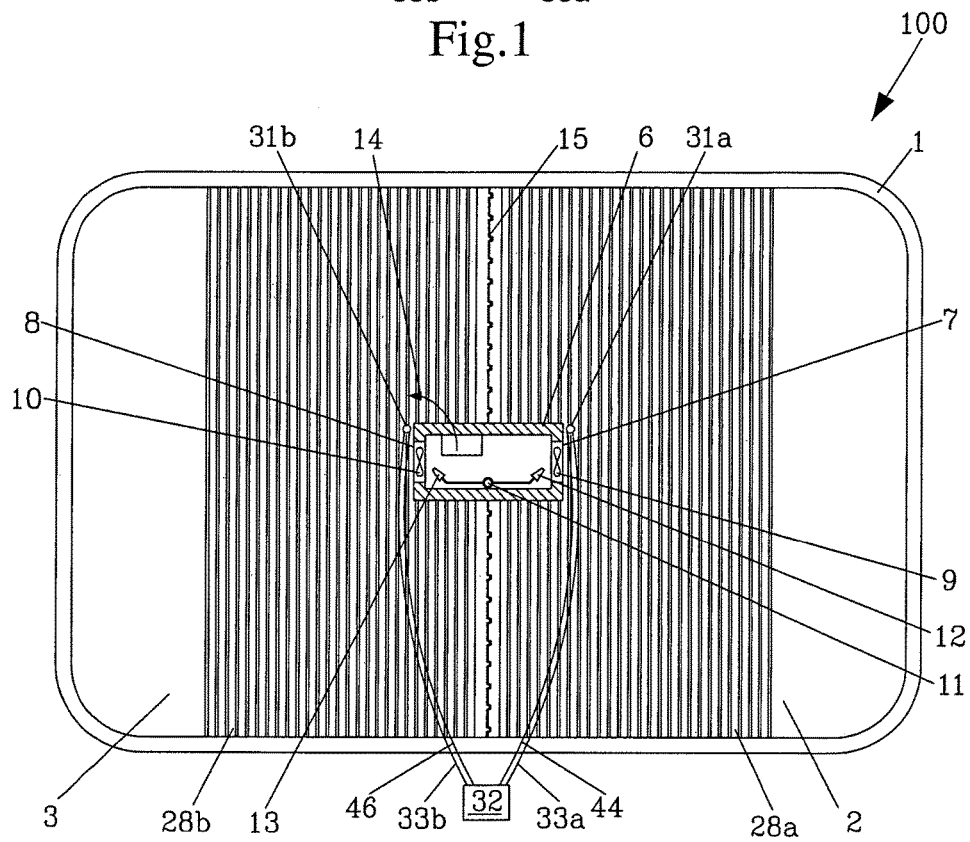
FIG. 2 shows the system of FIG. 1 from a top planar view.

FIGS. 1 and 2 show a system 100 for wastewater treatment in accordance with one embodiment of the invention. The system 100 is shown in a cross sectional view in FIG. 1 and in a planar view from above in FIG. 2.

The system 100 comprises a surrounding wall 1 and a bottom surface 112 that are impervious to liquids. A barrier 15 divides the system into a first basin 2 and a second basin 3 adapted to retain wastewater to be treated. This is by way of example only, and system of the invention may have any number of basins.

A pumping chamber 6 straddles the two chambers. The pumping chamber 6 is opened to the basin 2 via an opening 7 and to basin 3 via an opening 8, allowing direct hydraulic connection between the two basins. A first propeller pump 9 is located in or on the opening 7, for pumping water from the basin 2 to the pumping chamber 6. A second propeller pump 10 is located in or on the opening 8 for pumping water from the basin 3 to the pumping chamber 6. The openings 8 and 10 are at the same level and allow liquids to flow between the two basins under the influence of gravity when both pumps 9 and 10 are inactive.

In use, a substrate (not shown) is introduced into each of the basins for the treatment of wastewater. The substrate can be selected as required in any application, and may be formed, for example, from gravel, soil, or synthetic media, and serves to immobilize biological organisms, such as bacteria algae or plants. In particular, the wastewater treatment system of the invention may be configured as constructed wetlands.

Wastewater to be treated is delivered to the pumping chamber 6 via a branched delivery pipe 11, described in detail below.

Wastewater flowing between the pumping chamber 6 and the first basin 2 passes through a branched system of perforated pipes 28a through which wastewater is alternately taken up from, and released into, the basin 2. Similarly, wastewater flowing between the pumping chamber 6 and the second basin 3 passes through a branched system of perforated pipes 28b. The branched systems of pipes 28a and 28b ensure that water entering the basins is evenly distributed along the bottom of the basins, below the substrates, and that water is taken up uniformly from the basins into the systems of pipes. Effluent is discharged either at overflow weir 14, located in the pumping chamber 6, or alternatively at any other arrangement such as vertical flow channel 17, with discharge 18.

The system 100 further comprises a controller 32 that activates and deactivates the pumps 9 and 10 in order to execute a predetermined regime of reciprocating flow of wastewater between the two basins, via communications lines 44 and 46, respectively, as described in detail below. The first and second basins are provided with water level detectors 31a and 32b that also communicate with the controller 32 via a communication line 33a and 33b, respectively. In one embodiment, the controller regulates a pumping head of the pumping system to match a net actual head.

Figure 9:
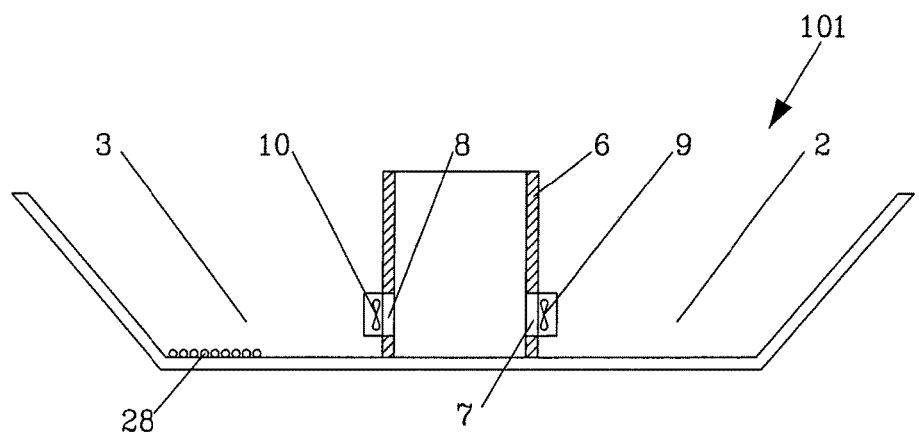
FIGS. 9 and 10 show a cross sectional side view and a top planar view, respectively, of a system for wastewater treatment in accordance with another embodiment of the invention.
Figure 10:
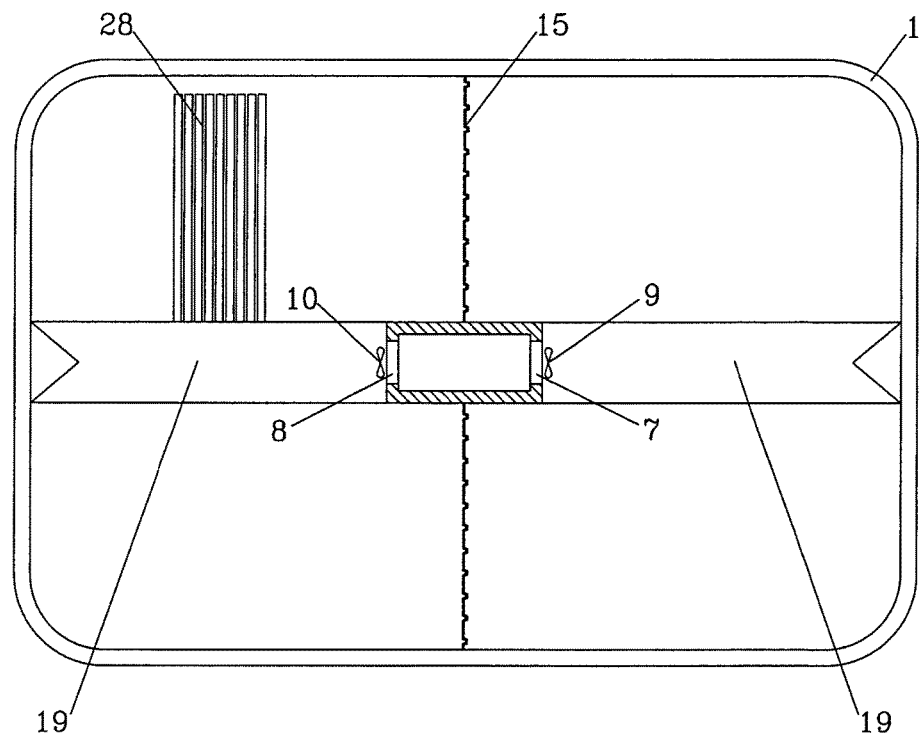

FIGS. 9 and 10 show another embodiment 101 of the system of the invention in which the pumps 9 and 10 are mounted on the wall of the pumping chamber 6 in the basins 2 and 3, respectively. Wastewater enters a channel 19 in one basin base through the openings 7 and 8 and into the channel 19 in the other basin.

Figure 11:
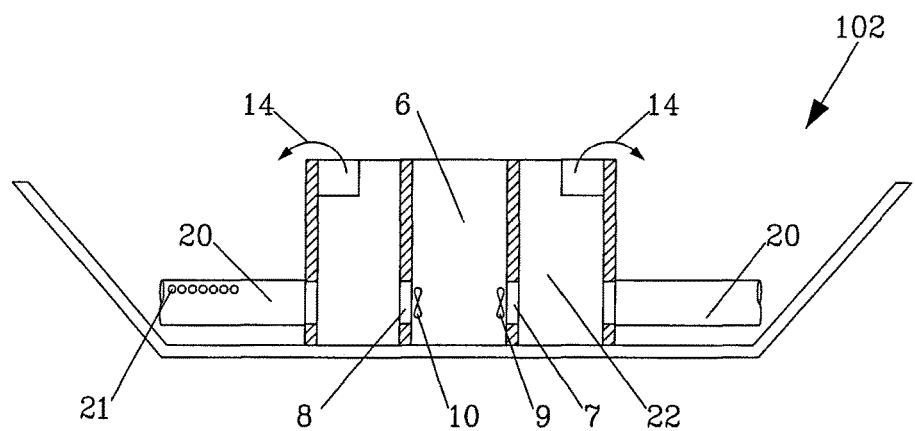
FIGS. 11 and 12 show a cross sectional side view and a top planar view, respectively, of a system for wastewater treatment in accordance with a third embodiment of the invention.
Figure 12:
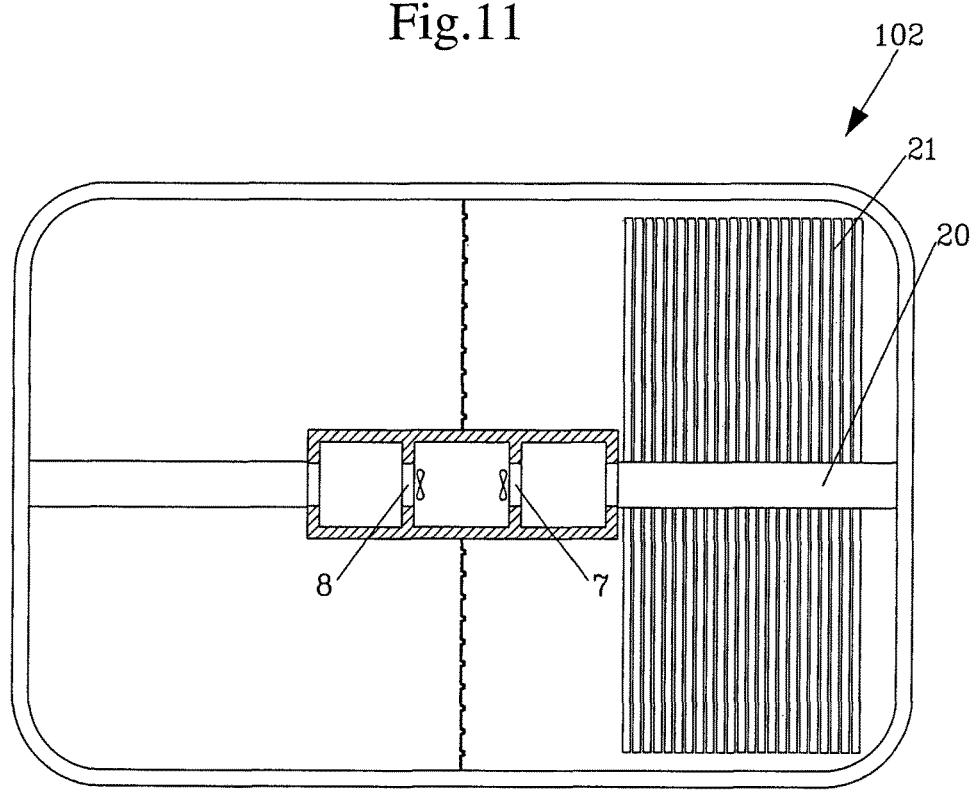

FIGS. 11 and 12 show another embodiment 102 where the pumps 9 and 10 are inside the pumping chamber 6 pumping water from the pumping chamber to a central main pipe 20 which is connected to the perforated pipes 28a and 28b. The pipe 20 may be directly connected to the pump discharge or alternatively connected to an intermediate chamber 22 between each pump and the pipe 20, serving as effluent weirs 14.

Figure 13:
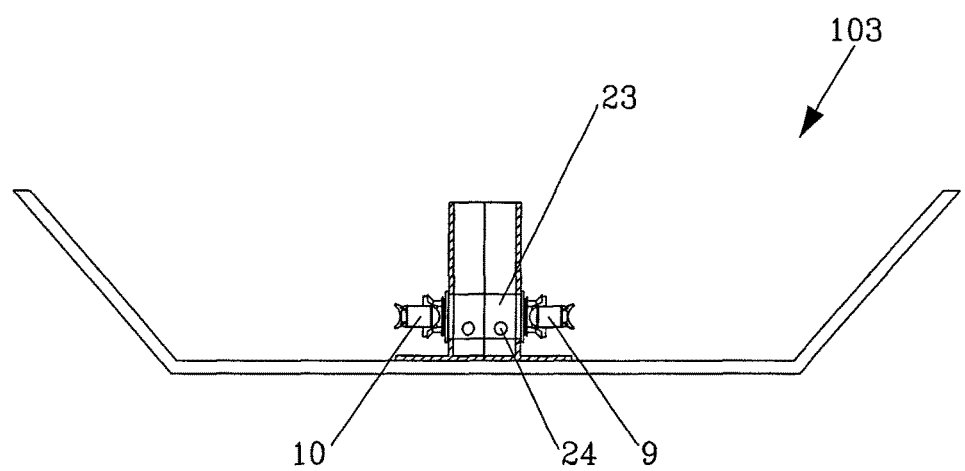
FIG. 13 shows a cross sectional side view of a system for wastewater treatment in accordance with a fourth embodiment of the invention.

FIG. 13 shows another embodiment 103 of the system of the invention in which a main pipe 23 conducts water between the pumps 9 and 10.

Figure 3:
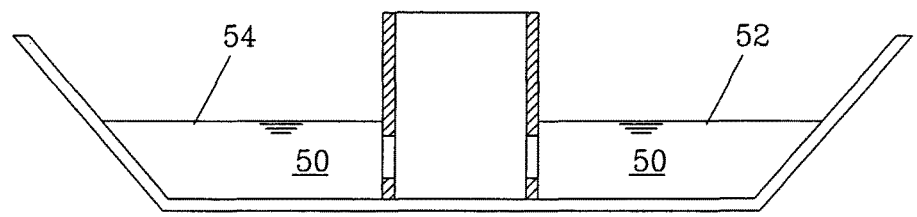
FIGS. 3 to 8 show successive stages in the movement of water between the two basins of the system of FIGS. 1 and 2.
Figure 14:
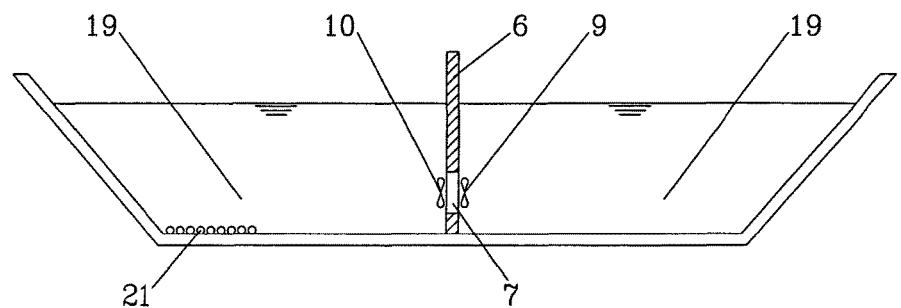
FIGS. 14 and 15 show a cross sectional side view and a top planar view, respectively, of a system for wastewater treatment in accordance with a fifth embodiment of the invention.
Figure 15:
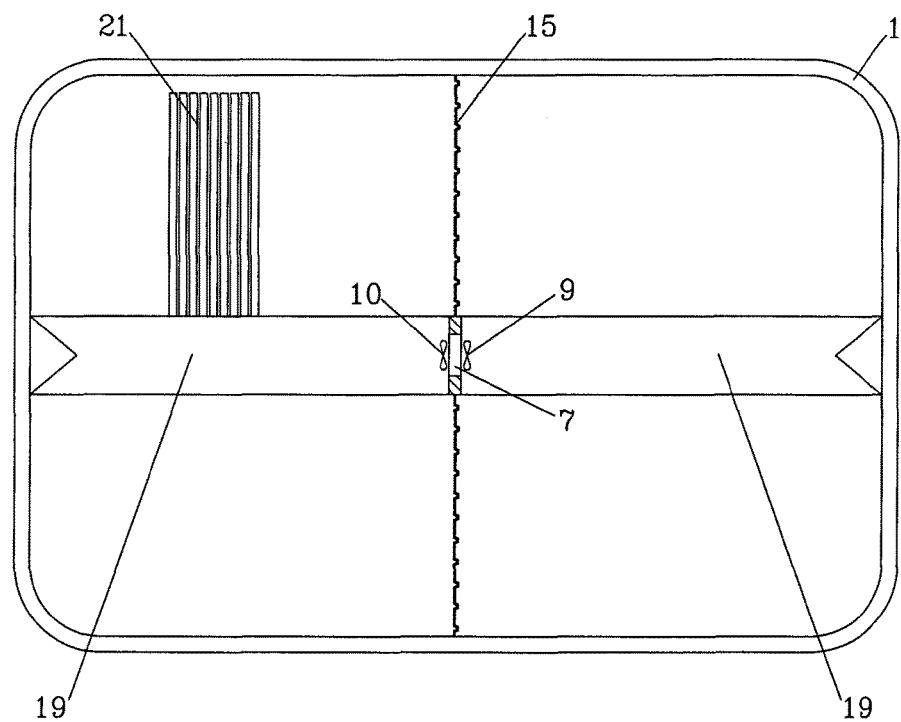

FIGS. 14 and 15 show yet another embodiment of the invention having a narrow pumping chamber 6;

FIGS. 3 to 8 show schematically a scheme of reciprocating water flow between the two basins in accordance with one embodiment of this aspect of the invention. In FIG. 3, an initial configuration is shown in which the first and second basins 2 and 3 are filled with wastewater 50 to be treated with the water level 52 in the first basin 2 being at about the same height as the water level 54 of the second basin. The initial configuration shown in FIG. 3 can be arrived at spontaneously when the pumps 9 and 10 are maintained inactive.

Figure 16:
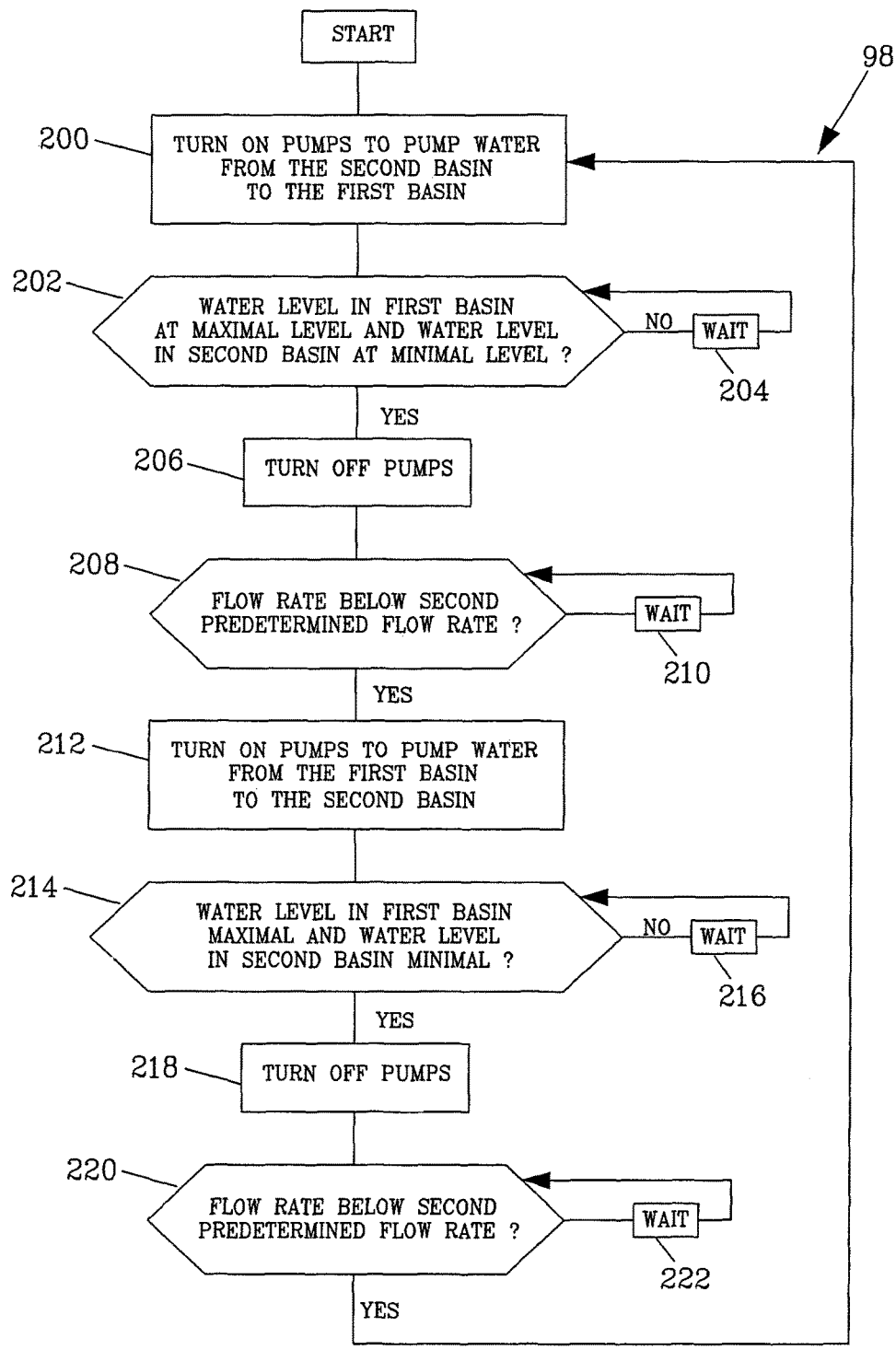
FIG. 16 shows a flow chart for operating a wastewater treatment system in accordance with a sixth embodiment of the invention.

FIG. 16 shows a flow chart for a process 98 of operating the system 100 starting from the initial configuration shown in FIG. 3, in accordance with one embodiment of this aspect of the invention. In the configuration of FIG. 3, the second basin is a source basin and the first basin is a recipient basin.

Figure 4:
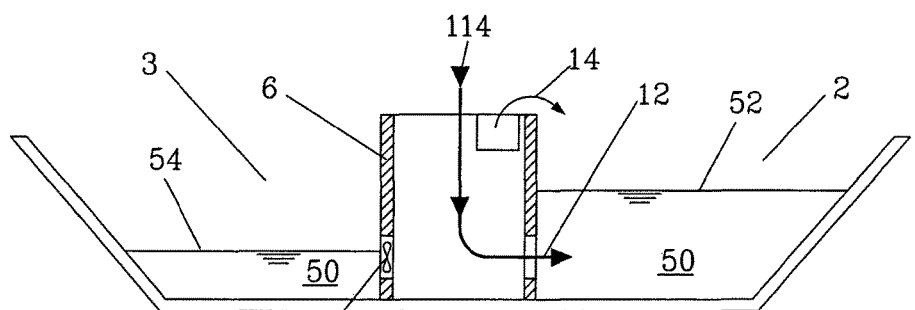
Figure 5:
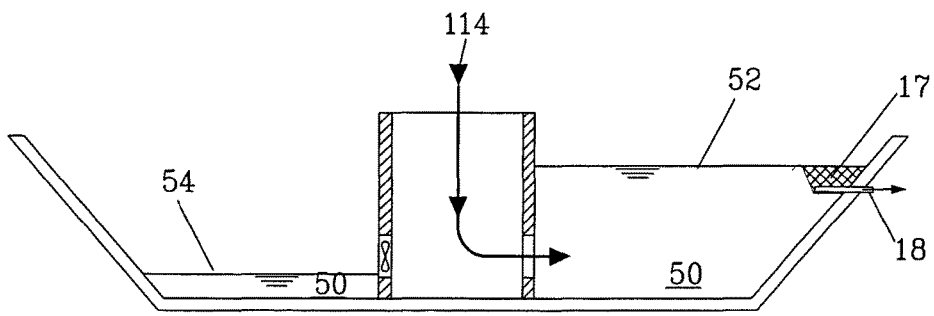
Figure 6:
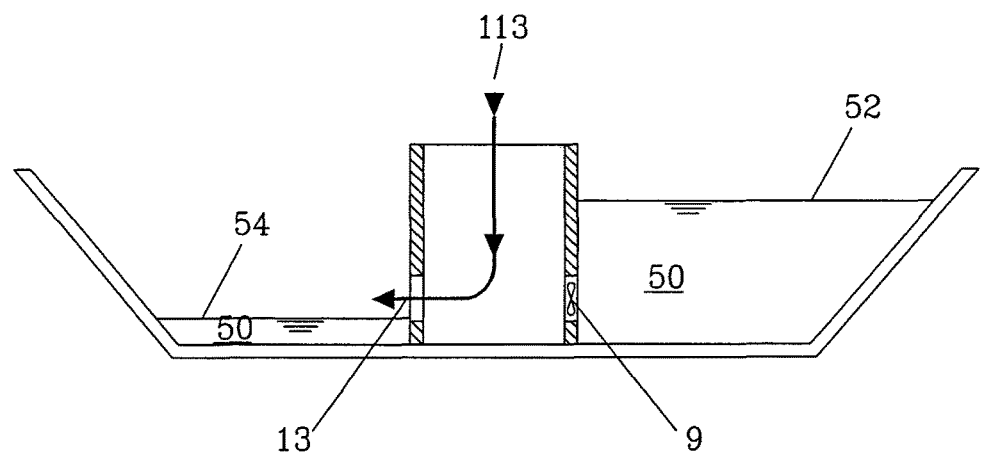

The process 98 begins with the controller 32 activating the pump 9 to pump water from the second basin to the first basin (step 200), as indicated in FIG. 4. The controller 32 monitors the level of the water in each basin and in step 202 it is determined whether the system 100 has achieved the configuration shown in FIGS. 5 and 6 in which the water level 52 in the first basin is at a predetermined maximal level (or alternatively the water level in the second basin is at a predetermined minimal level), or if a ratio of flow rate to energy input is below a predetermined ratio. The energy input may be for example, the electrical current being supplied to the pump. If no, the controller waits a first predetermined amount of time (step 204) and then returns to step 202. If the water levels have reached the predetermined levels (FIGS. 5 and 6), then in step 206 the pump 9 is turned off.

At this point, the first basin becomes a source basin and the second basin becomes a recipient basin. Since the water level 52 in the first basin is above the water level 54 of the second basin, after turning off the pump 9, wastewater 50 flows from the first basin 2 to the second basin 3 through the system of pipes 28a, the pump 9, the pumping chamber 6, the pump 10, and the system of pipes 28b under the influence of gravity alone. The controller 32 continuously or periodically monitors the water level in each basin and calculates a flow rate from the rate of change of the water level in one or both of the basins. As the wastewater 50 flows from the first basin to the second basin, the flow rate gradually decreases. In step 208, the controller 32 periodically determines whether the flow rate is below a first predetermined flow rate. If no, the processor waits a predetermined amount of time (step 210) and then returns to step 208. If the flow rate is below the first predetermined flow rate, then the system 100 has arrived at the configuration shown in FIG. 7 in which the water level 52 in the first basin is slightly higher than the water level 54 in the second basin.

Figure 7:
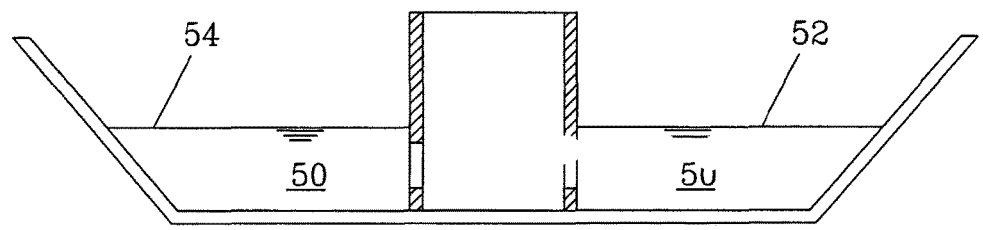
Figure 8:
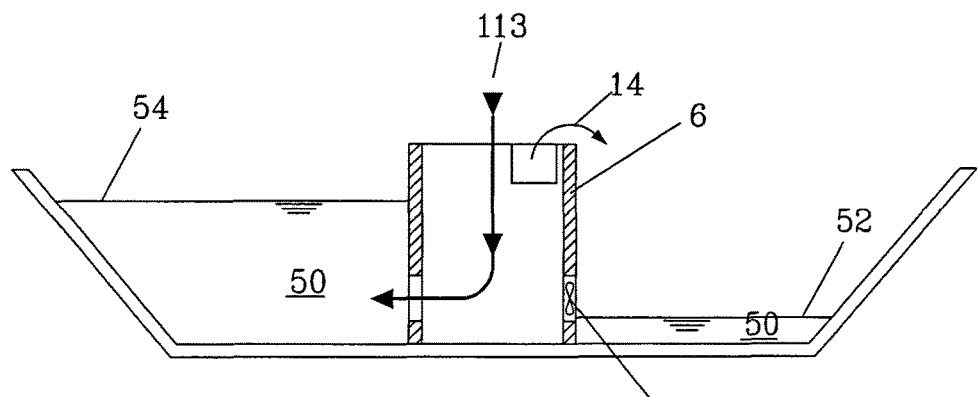

In the configuration of FIG. 7, the controller 32 activates the pump 10 to pump water from the first basin to the second basin (step 212). The controller 32 continues to monitor the level of the water in each basin and in step 120 it is determined whether the system 100 has achieved the configuration shown in FIG. 8 in which the water level 52 in the first basin is at its minimal level and the water level 54 in the second basin is at its maximal level (step 214). If no, the processor waits a predetermined amount of time (step 216) and then returns to step 214. If the water level 52 in the first basin is at its maximal level and the water level 54 in the second basin is at its minimal level, then in step 124 the pump 10 is turned off (step 218).

At this state, the second basin becomes the source basin again, and the first basin becomes the recipient basin. Since the water level 54 in the second basin is above the water level 52 in the first basin, wastewater 50 flows from the second basin 3 into to the first basin 2 through the system of pipes 28b, the pump 10, the pumping chamber 6, the pump 9, and the system of pipes 28a under the influence of gravity alone. The processor 34 continuously or periodically monitors the water level in each basin and calculates a flow rate from the rate of change of the water level in one or both of the basins. As the wastewater 50 flows from the second basin to the first basin, the flow rate gradually decreases. In step 220, the controller 32 periodically determines whether the flow rate is below a second predetermined flow rate, which may be equal to the first predetermined flow rate. If not, the processor waits a predetermined amount of time (step 222) and then returns to step 218. If the flow rate is below the second predetermined flow rate, then the system 100 has reachieved the configuration shown in 3 in which the water level 54 in the second basin is slightly higher than the water level 52 in the first basin. The process 98 can then return to step 200.

During the episodes of pumping by the pumping system, the pumping system can be controlled to maintain a constant pressure on the water in the pumping system as the water levels in the basins change.

As the process 98 is being executed, the quality of the wastewater 50 may be continuously or periodically monitored. Monitoring of the water quality may be performed by the controller by means of one or more sensors located inside one or both of the basins. Alternatively, monitoring of the water quality may be performed manually.

At any time, raw wastewater can be delivered to the pumping chamber 6 via the delivery pipe 11, which branches into two branches 12 and 13. Branch 12 directs incoming wastewater towards the opening 7 and branch 13 directs incoming wastewater towards the opening 8. When the flow of wastewater in the pumping chamber 6 is from basin 2 towards basin 3 (as occurs when the system 100 passes from the configuration of FIG. 6 to the configuration of FIG. 8), a Venturi suction arrangement 17b at the opening of the branch 13 causes the release of wastewater from the branch 13 into the pumping clamberer 6 adjacent to the opening 8, as indicated by the arrow 113 in FIGS. 6 and 8. At the same time, wastewater entering the pumping chamber 6 through the opening 6 is forced into a Venturi suction arrangement 17a located at the opening of the branch 12, preventing the release of wastewater from the branch 12 into the pumping chamber 6. Similarly, when the flow of wastewater in the pumping chamber 6 is from basin 3 towards basin 2 (as occurs when the system 100 passes from the configuration of FIG. 8 to the configuration of FIG. 5), the Venturi arrangement 17a at the opening of the branch 12 causes the release of wastewater from the branch 12 into the pumping chamber 6 adjacent to the opening 7, as indicated by the arrow 114 in FIGS. 4 and 5. At the same time, wastewater entering the pumping chamber 6 through the opening 8 is forced into the Venturi arrangement 17b located at the opening of the branch 12, preventing the release of wastewater from the branch 13 into the pumping chamber 6. This tends to reduce the amount of raw wastewater present at any time in the pumping chamber 6.

Effluent can be removed from the system 100 via an overflow weir 14 or via a vertical flow section 17 in which the effluent is drained through a discharge port 18. The amount of effluent discharged at the overflow weir is proportional to the total amount of water in the two basins. When total water amount is higher then the target value, effluent flow rate is higher. When total water amount is smaller than the target value, effluent flow rate is lower. Therefore, setting the overflow level at a certain predetermined level, leads automatically into stable equilibrium of total water content in both basins.

Figure 17:
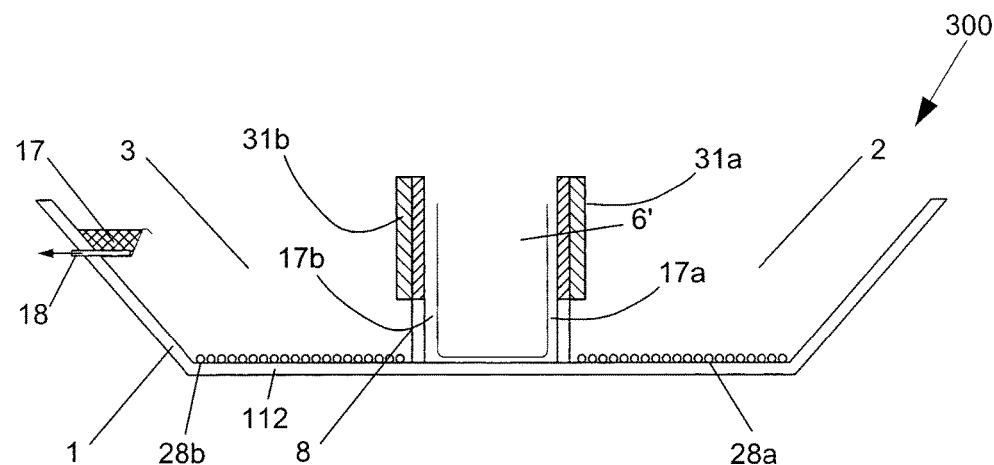
FIG. 17 shows a cross sectional side view of system for treating wastewater having two basins in accordance with yet another embodiment of the invention.
Figure 18:
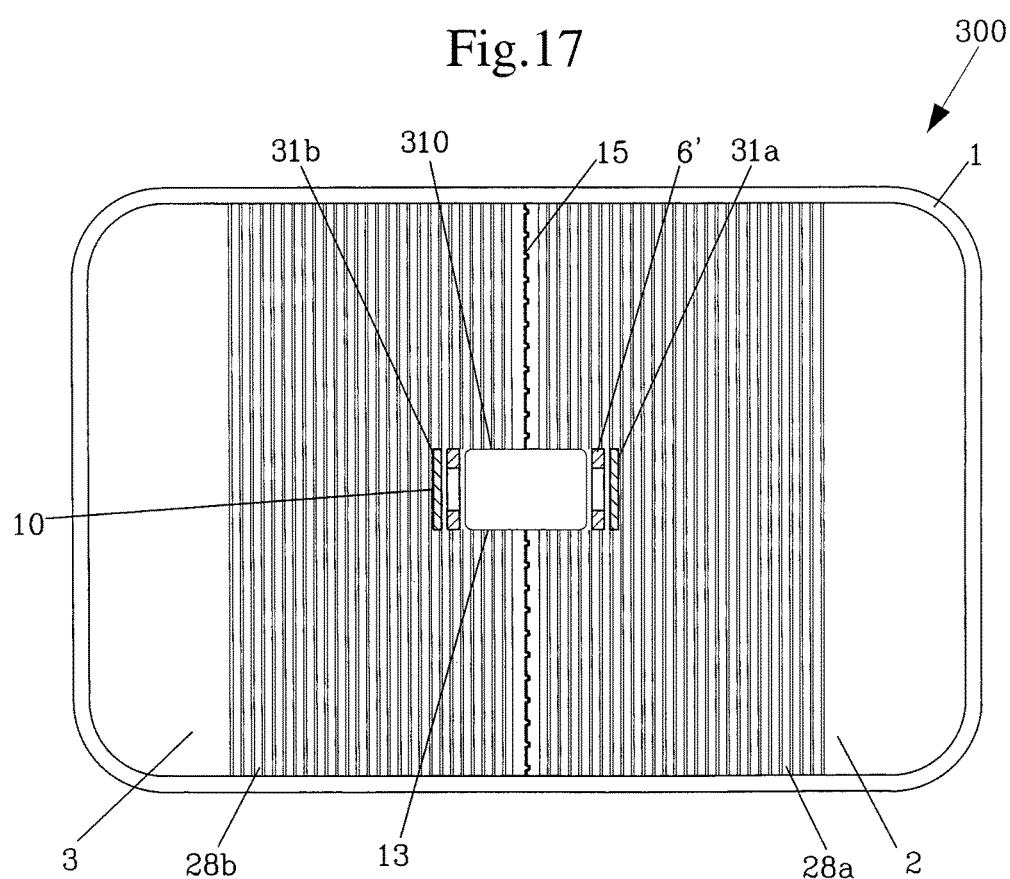
FIG. 18 shows the system of FIG. 17 from a top planar view.

FIGS. 17 and 18 show a system 300 for wastewater treatment in accordance with one embodiment of the invention. The system 300 is shown in a cross sectional view in FIG. 17 and in a planar view from above in FIG. 18. The system 300 has several components in common with the system 10 shown in FIGS. 1 and 2, and similar components are indicated by the same reference numeral in both systems without further comment.

The system 300 has a pumping chamber 6' that straddles the chambers 2 and 3. The pumping chamber 6' is configured to receive a pumping system 310 that that is inserted into the pumping chamber 6'.

Figure 19:
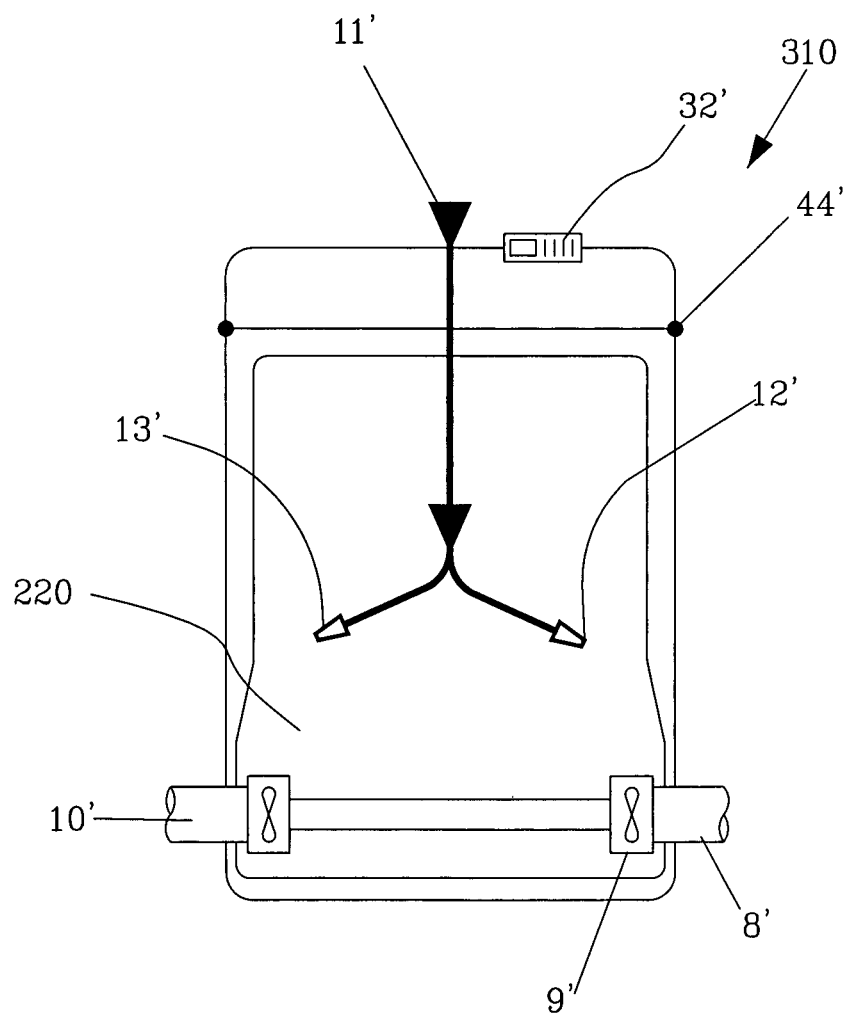
FIG. 19 shows s pumping system for use in the wastewater treatment system of FIGS. 17 and 18.

The pumping system 310 is shown schematically in greater detail in FIG. 19. The pumping system 210 has a receptacle tank 220 for receiving water to be treated. On one side, the receptacle tank opens to the basin 2 via a first outlet pipe 8' and opens to the basin 3 via a second outlet pipe 10'. A first propeller pump 9' pumps water between the basin 2 and the receptacle tank 220 through the first outlet pipe 8'. A second propeller pump 10 pumps water between the basin 3 and the receptacle tank 220 via the second outlet pipe 10'. The outlet pipes 8' and 10' are configured to connect with the branched system of perforated pipes 28a and 28b, respectively, and are at the same level and allow liquids to flow between the two basins under the influence of gravity when both pumps 9' and 10' are inactive.

Wastewater to be treated is delivered to the receptacle tank 220 via delivery pipe 11'. The pumping system 200 further comprises a controller 32' that activates and deactivates the pumps 9' and 10' in order to execute a predetermined regime of reciprocating flow of wastewater between the two basins. The processor 32' is provided with first and second sockets 44' and 46 that are configured to connect with the water level transmitters 31a and 32b, respectively.

The delivery pipe 11 may branch into two branches 12' and 13'. In this case, raw wastewater is delivered to the receptacle tank 220 via the delivery pipe 11' Branch 12 directs incoming wastewater towards the outlet pipe 8' and branch 13' directs incoming wastewater towards the opening outlet pipe 10'. The branched delivery pipe thus creates a Venturi suction arrangement as explained above.

The invention claimed is:

1. A method for operating a system for treatment of wastewater having at least two basins, each of the at least two basins alternating between a state of being a source basin and a state of being a recipient basin, the method comprising, for each pair of the source basin and the recipient basin, executing a predetermined regime of reciprocating flow of wastewater between the at least two basins, the method comprising:

(I) allowing wastewater to flow from the source basin to the recipient basin by:
   (a) allowing a gravitational flow of wastewater through a conduit from the source basin to the recipient basin under the influence of gravity when a water level in the source basin is above a water level of the recipient basin to cause wastewater to gravitationally flow from the source basin into the recipient basin, thereby enabling the water level of the source basin and the water level of the recipient basin to at least approach being at substantially the same water level; and
   (b) operating a pumping system to pump wastewater from the source basin to the recipient basin to provide a water level in the recipient basin that is above a water level of the source basin; and (II) following step (I), converting the source basin and the recipient basin to a recipient basin and a source basin, respectively, and repeating step (I).

2. The method according to claim 1, wherein step (b) comprises:
   (i) activating the pumping system to pump wastewater from the source basin to the recipient basin when a wastewater level in the source basin is at a first predetermined height or when a rate of gravitational flow of wastewater from the source basin to the recipient basin is below a first predetermined flow rate, wherein the first predetermined height is less than a source basin maximal level; and
   (ii) turning off the pumping system when the water level in the source basin is at a source basin minimal level, or when the water level in the recipient basin is at a recipient basin maximal level, or when a ratio of flow rate to energy input is below a predetermined level.

3. The method according to claim 1, wherein the step of selectively converting the source basin and the recipient basin to a recipient basin and a source basin, respectively, is implemented after step (I) and when:
   the water level in the source basin is at a source basin minimal level;
   the water level in the recipient basin is at a recipient basin maximal level; or
   a ratio of flow rate to energy input is below a predetermined level.

4. The method according to claim 1, wherein in step (I), wastewater is caused to flow from the source basin to the recipient basin via a pumping chamber provided between the at least two basins.

5. The method according to claim 4, further comprising delivering raw wastewater to the pumping chamber.

6. The method according to claim 1, further comprising delivering raw wastewater to the recipient basin.

7. The method according to claim 1, wherein the at least two basins are only two basins.

8. The method of claim 1, wherein step (I)(b) is initiated when a level of wastewater in the source basin is higher than a level of wastewater in the recipient basin.

9. The method of claim 1, wherein step (I)(b) is initiated when a level of wastewater in the source basin and a level of wastewater in the recipient basin are at substantially the same water level.

10. The method of claim 1, wherein step (I)(b) is initiated when a level of wastewater in the source basin is below a level of wastewater at the recipient basin.

* * * * *